United States Patent
Straub

(10) Patent No.: US 8,627,659 B2
(45) Date of Patent: Jan. 14, 2014

(54) ENGINE ASSEMBLY INCLUDING EXHAUST PORT SEPARATION FOR TURBINE FEED

(75) Inventor: Robert D. Straub, Lowell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 103 days.

(21) Appl. No.: 13/292,611

(22) Filed: Nov. 9, 2011

(65) Prior Publication Data

US 2013/0111899 A1 May 9, 2013

(51) Int. Cl.
*F02D 23/00* (2006.01)
*F01L 1/34* (2006.01)

(52) U.S. Cl.
USPC .................................. 60/602; 123/90.15

(58) Field of Classification Search
USPC .................. 60/602; 123/90.15, 90.16, 90.17
See application file for complete search history.

(56) References Cited

U.S. PATENT DOCUMENTS

| | | | | |
|---|---|---|---|---|
| 5,417,068 A | * | 5/1995 | Olofsson | 60/602 |
| 6,415,600 B1 | * | 7/2002 | Lejon | 60/602 |
| 7,748,354 B2 | * | 7/2010 | Petridis | 123/90.15 |
| 7,895,979 B2 | * | 3/2011 | Lancefield et al. | 123/90.15 |
| 8,069,663 B2 | * | 12/2011 | Ulrey et al. | 60/602 |
| 8,276,365 B2 | * | 10/2012 | Hokuto et al. | 123/90.15 |
| 2010/0077746 A1 | * | 4/2010 | Gray, Jr. | 60/604 |
| 2011/0000470 A1 | * | 1/2011 | Roth | 123/90.15 |

FOREIGN PATENT DOCUMENTS

DE 10235134 A1 2/2004

* cited by examiner

*Primary Examiner* — Thomas Denion
*Assistant Examiner* — Ngoc T Nguyen
(74) *Attorney, Agent, or Firm* — Harness, Dickey & Pierce, P.L.C.

(57) ABSTRACT

An engine assembly may include an engine structure, first and second exhaust gas conduits, a turbine and a flow control mechanism. The engine structure may define a first cylinder and first and second exhaust ports in communication with the first cylinder. The first exhaust gas conduit may be in fluid communication with the first exhaust port. The second exhaust gas conduit may be in fluid communication with the second exhaust port. The turbine may be in fluid communication with the first exhaust gas conduit. The flow control mechanism may prevent the exhaust gas from the first cylinder from flowing through the second exhaust gas conduit during a first mode and may allow the exhaust gas to flow through both the first and second exhaust gas conduits during a second mode.

9 Claims, 6 Drawing Sheets

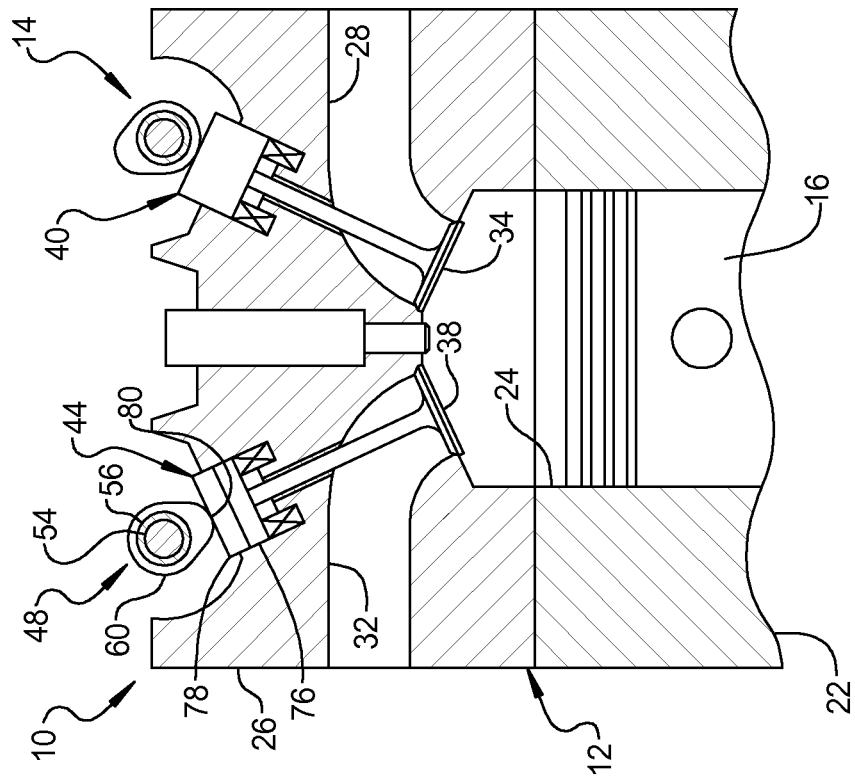
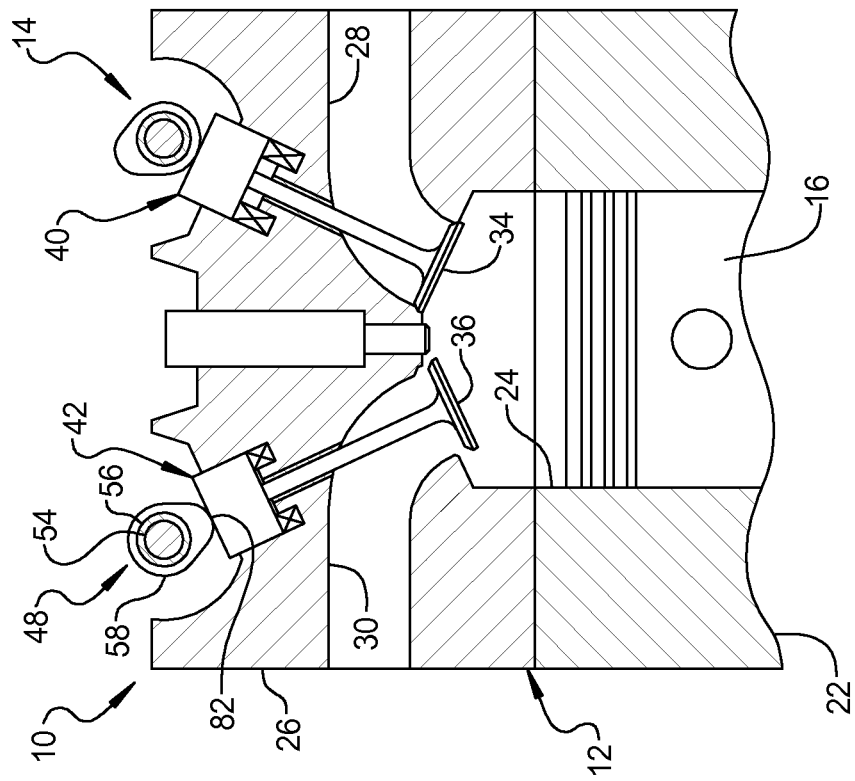

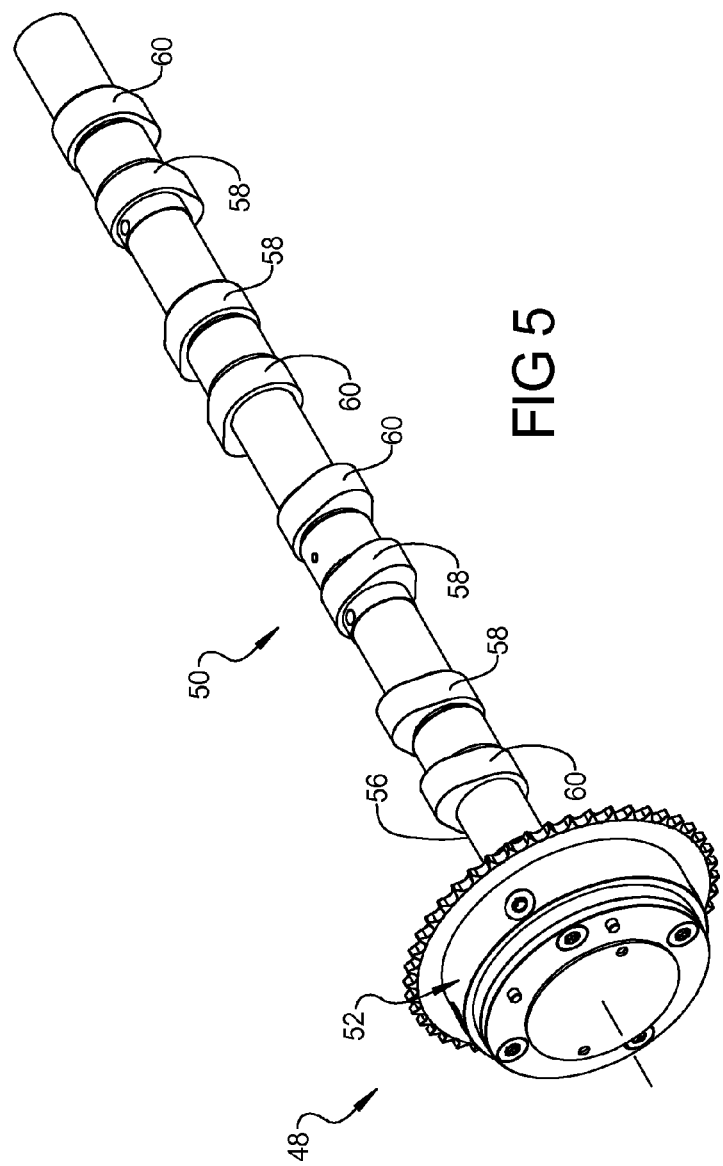

ENGINE ASSEMBLY INCLUDING EXHAUST PORT SEPARATION FOR TURBINE FEED

FIELD

The present disclosure relates to engine exhaust gas flow control.

BACKGROUND

This section provides background information related to the present disclosure which is not necessarily prior art.

Internal combustion engines may combust a mixture of air and fuel in cylinders and thereby produce drive torque. Exhaust ports may direct exhaust gases from the cylinders to an exhaust system. Exhaust gases may be utilized to power auxiliary engine components such as turbines.

SUMMARY

An engine assembly may include an engine structure, a first exhaust gas conduit, a second exhaust gas conduit, a turbine and a flow control mechanism. The engine structure may define a first cylinder and first and second exhaust ports in communication with the first cylinder. The first exhaust gas conduit may be in fluid communication with the first exhaust port. The first exhaust gas conduit and the first exhaust port may define a first exhaust gas flow path. The second exhaust gas conduit may be in fluid communication with the second exhaust port. The second exhaust gas conduit and the second exhaust port may define a second exhaust gas flow path. The turbine may be in fluid communication with the first exhaust gas flow path and may include a turbine wheel rotationally driven by exhaust gas from the first cylinder provided by the first exhaust gas conduit. The flow control mechanism may be operable in first and second modes and located in the second exhaust gas flow path. The flow control mechanism may prevent the exhaust gas from the first cylinder from flowing through the second exhaust gas flow path and may force all of the exhaust gas from the first cylinder through the first exhaust gas flow path during the first mode. The flow control mechanism may allow the exhaust gas from the first cylinder to flow through both the first and second exhaust gas flow paths during the second mode.

In another arrangement, an engine assembly may include an engine structure, a piston, first and second exhaust valves, first and second valve lift mechanisms and a turbine. The engine structure may define a first cylinder and first and second exhaust ports in communication with the first cylinder. The piston may be located within the first cylinder, the first exhaust valve may be located within the first exhaust port and the second exhaust valve may be located in the second exhaust port. The first valve lift mechanism may be supported on the engine structure and may be engaged with the first exhaust valve and the second valve lift mechanism may be supported on the engine structure and may be engaged with the second exhaust valve. The second valve lift mechanism may be operable in first and second modes. The second valve lift mechanism may maintain the second exhaust valve in a closed position during an exhaust stroke of the piston during the first mode and may open the second exhaust valve during the exhaust stroke of the piston during the second mode. The first valve lift mechanism may open the first exhaust valve during the exhaust stroke of the piston when the second valve lift mechanism is operated in the first mode. The turbine may be in fluid communication with the first exhaust port and may include a turbine wheel rotationally driven by exhaust gas from the first cylinder provided by the first exhaust port.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

FIG. 3 is a schematic fragmentary section view of the engine assembly of FIG. 1;

FIG. 4 is an additional schematic fragmentary section view of the engine assembly of FIG. 1;

FIG. 5 is a perspective view of a camshaft assembly according to the present disclosure;

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
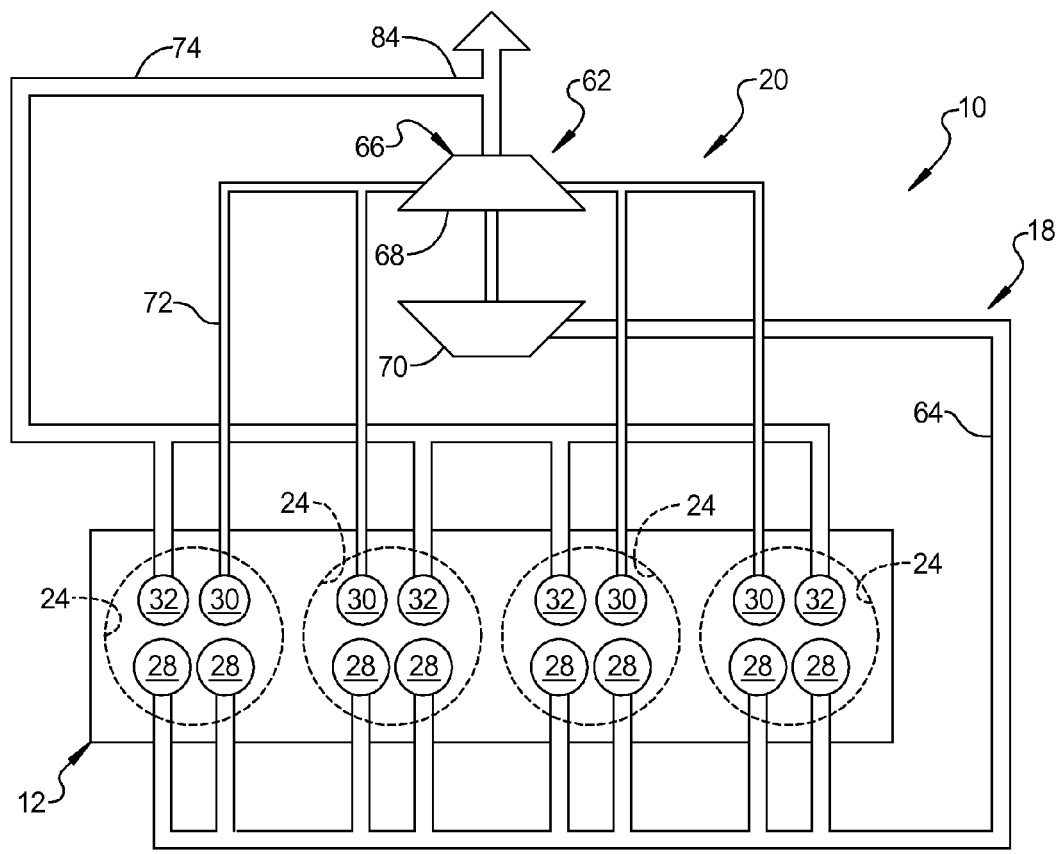
FIG. 1 is schematic illustration of an engine assembly according to the present disclosure.

With reference to FIGS. 1, 3 and 4, an engine assembly 10 may include an engine structure 12, a valvetrain assembly 14, pistons 16, an air intake assembly 18 and an exhaust system 20. The engine structure 12 may include an engine block 22 defining cylinders 24 and a cylinder head 26 coupled to the engine block 22. The cylinder head 26 may define intake ports 28 and first and second exhaust ports 30, 32 in communication with each of the cylinders 24. While the present non-limiting example is illustrated as an inline four cylinder arrangement, it is understood that the present teachings apply to any number of piston-cylinder arrangements and a variety of reciprocating engine configurations including, but not limited to, V-engines, inline engines, and horizontally opposed engines. It is further understood that the present teachings are not limited to overhead cam arrangements.

The valvetrain assembly 14 may include intake valves 34 located in the intake ports 28, first exhaust valves 36 located in the first exhaust ports 30, second exhaust valves 38 located in the second exhaust ports 32, intake valve lift mechanisms 40 engaged with the intake valves 34, first exhaust valve lift mechanisms 42 engaged with the first exhaust valves 36, second exhaust valve lift mechanisms 44 engaged with the second exhaust valves 38, and a camshaft assembly 48 supported for rotation on the engine structure 12 by the cylinder head 26. As seen in FIG. 5, the camshaft assembly 48 may include a camshaft 50 and a cam phaser 52 coupled to the camshaft 50. The camshaft 50 may include first and second shafts 54, 56 (FIGS. 3 and 4) that are rotatable relative to one another via the cam phaser 52, first cam lobes 58 fixed for rotation with the first shaft 54 and second cam lobes 60 fixed for rotation with the second shaft 56. The first cam lobes 58 may be engaged with the first exhaust valve lift mechanisms 42 and the second cam lobes 60 may be engaged with the second exhaust valve lift mechanisms 44.

Figure 2:
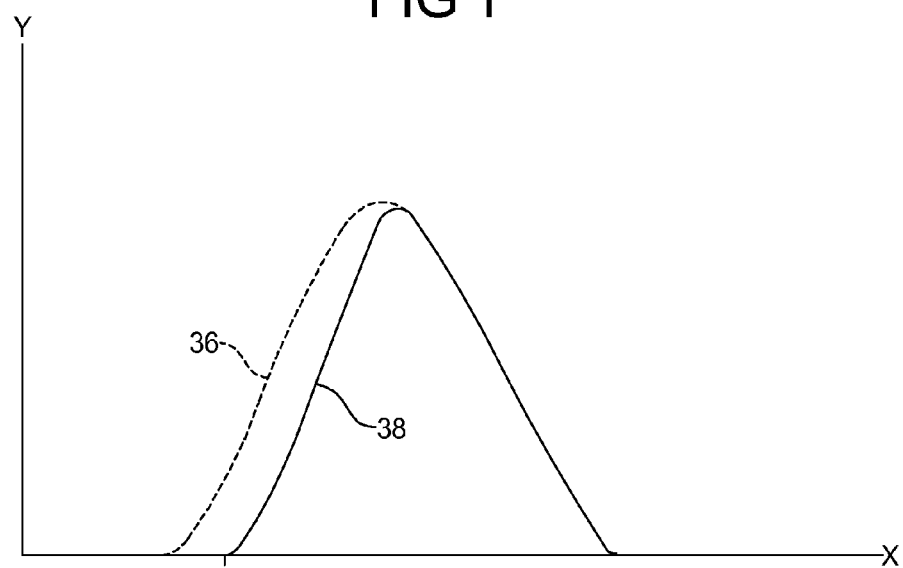
FIG. 2 is a graphical illustration of exhaust valve opening for the engine assembly of FIG. 1.

Therefore, the timing of opening the first and second exhaust valves 36, 38 may be varied relative to one another for each cylinder 24. Alternatively, or additionally, the profile of the first and second cam lobes 58, 60 may be different from one another to provide different opening profiles for the first and second exhaust valves 36, 38. FIG. 2 illustrates a non-limiting example of the differing opening profiles of the first and second exhaust valves 36, 38 provided by the cam phaser 52 and/or the lobe profiles. In FIG. 2, the X-axis depicts crank angle and the Y-axis depicts valve lift. As seen in FIG. 2, the first exhaust valve 36 may start to open before the second exhaust valve 38. More specifically, the first exhaust valve 36 may begin to open before a bottom dead center (BDC) position of the piston 16 starting the exhaust stroke of the piston 16. The second exhaust valve 38 may begin to open after the beginning of opening of the first exhaust valve 36 and at a time at or after the BDC position.

The air intake assembly 18 may include a turbocharger 62 and an intake air conduit 64 extending from the intake ports 28 to the turbocharger 62. The turbocharger 62 may include a turbine 66 having a turbine wheel 68 and a compressor wheel 70 fixed for rotation with the turbine wheel 68. While illustrated in combination with a turbocharger 62, its is understood that the present disclosure applies equally to alternate arrangements including, but not limited to, arrangements where a turbine is used to drive an auxiliary engine component such as a generator for a battery in a hybrid powertrain.

The exhaust system 20 may include a first exhaust gas conduit 72 and a second exhaust gas conduit 74. The first exhaust gas conduit 72 may be in fluid communication with the first exhaust port 30 and the combination of the first exhaust gas conduit 72 and the first exhaust port 30 may define a first exhaust gas flow path. The second exhaust gas conduit 74 may be in fluid communication with the second exhaust port 32 and the combination of the second exhaust gas conduit 74 and the second exhaust port 32 may define a second exhaust gas flow path. The first and second exhaust gas conduits 72, 74 may form parallel flow paths, with the first exhaust gas conduit 72 extending from the first exhaust ports 30 to the turbine wheel 68 and the second exhaust gas conduit 74 extending from the second exhaust ports 32 to a location in the exhaust system 20 downstream of the turbine wheel 68.

In the arrangement shown in FIGS. 1, 3 and 4, the second exhaust valve lift mechanism 44 may form a flow control mechanism including a deactivating valve lift mechanism. One cylinder is illustrated in FIGS. 3 and 4 for simplicity, with the understanding that the description applies equally to the remaining cylinders. The second exhaust valve lift mechanism 44 (schematically illustrated in FIG. 4) may include a first member 76 engaged with the second exhaust valve 38 and a second member 78 engaged with the second cam lobe 60. The second exhaust valve lift mechanism 44 may be operable in first and second modes.

The first and second members 76, 78 may be fixed for displacement with one another during the first mode. The second exhaust valve 38 may be displaced to an open position by the second exhaust valve lift mechanism 44 during the first mode when a peak 80 of the second cam lobe 60 engages the second exhaust valve lift mechanism 44. The first and second members 76, 78 may be displaceable relative to one another during the second mode (FIG. 4). The second exhaust valve 38 may remain in a closed position during the second mode when the peak 80 of the second cam lobe 60 engages the second exhaust valve lift mechanism 44. The first exhaust valve 36 may be displaced to an open position by the first exhaust valve lift mechanism 42 during the first and second modes when a peak 82 of the first cam lobe 58 engages the first exhaust valve lift mechanism 42.

Figure 6:
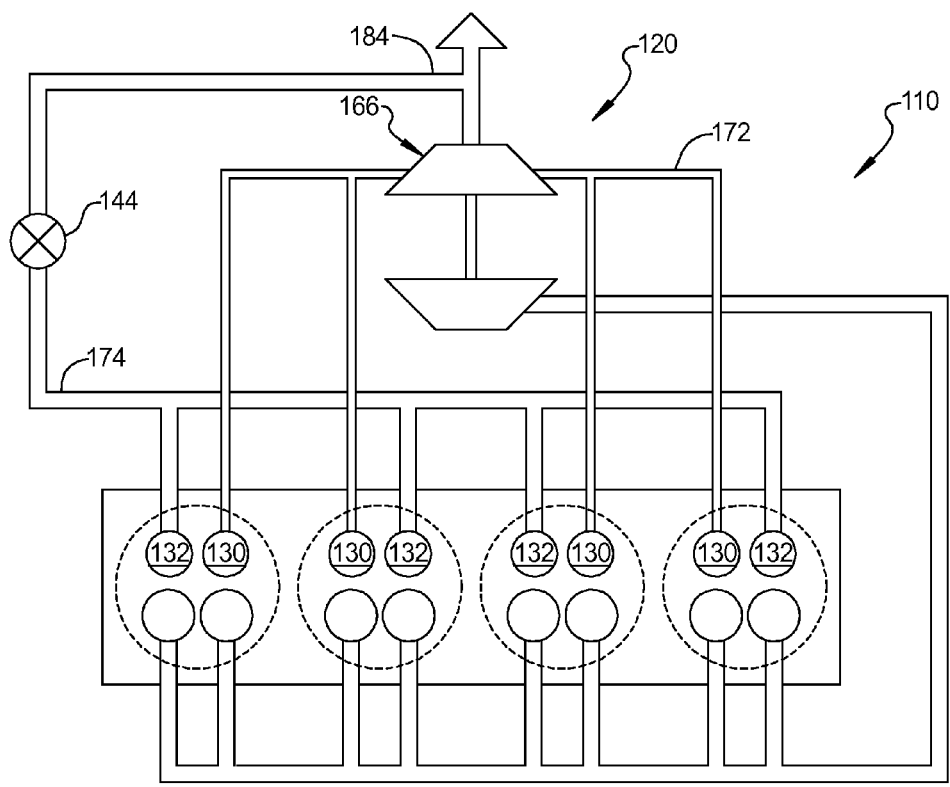
FIG. 6 is a schematic illustration of an alternate engine assembly according to the present disclosure.

During operation, the second exhaust valve lift mechanisms 44 may be operated in the second mode to direct all exhaust gas flow from the cylinders 24 through the first exhaust ports 30 and to the turbine 66. An alternate arrangement is illustrated in FIG. 6 and may be generally similar to the engine assembly 10 shown in FIG. 1 with the exceptions noted below. In the arrangement of FIG. 6, the first exhaust ports 130 may be in communication with the first exhaust gas conduit 172 and the second exhaust ports 132 may be in communication with the second exhaust gas conduit 174. In the engine assembly 110 shown in FIG. 6, a valve 144 may be located in the second exhaust gas conduit 174 and may form the flow control mechanism instead of using a deactivating valve lift mechanism. FIGS. 1 and 6 each illustrate the outlet 84, 184 of the second exhaust gas conduit 74, 174 in communication with a region of the exhaust system 20, 120 downstream from the turbine 66, 166. However, the present disclosure is not limited to these arrangements and applies equally to a variety of alternate arrangements including, but not limited to, those shown in FIGS. 7 and 8.

Figure 7:
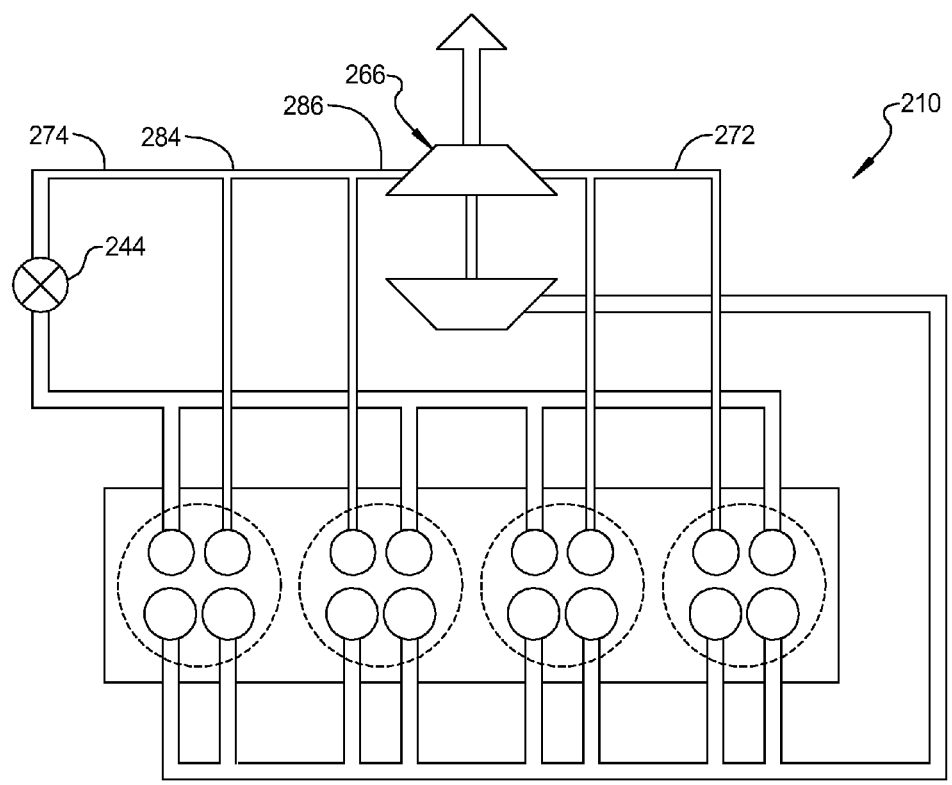
FIG. 7 is a schematic illustration of an alternate engine assembly according to the present disclosure.
Figure 8:
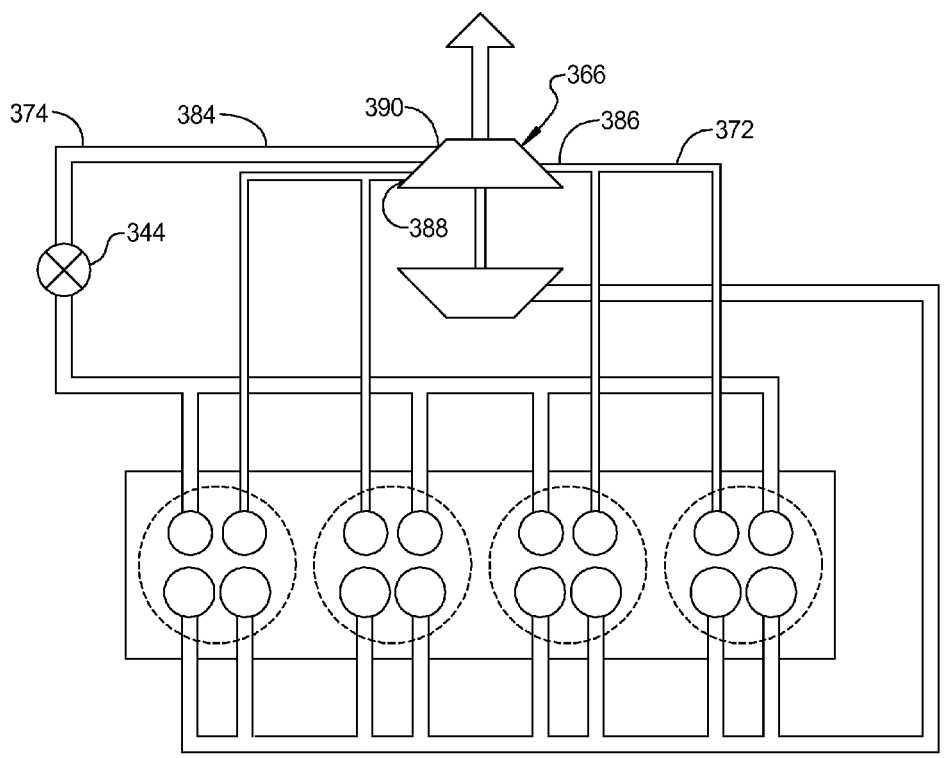
FIG. 8 is a schematic illustration of an alternate engine assembly according to the present disclosure.

The engine assemblies 210, 310 shown in FIGS. 7 and 8 are generally similar to the engine assembly shown in FIG. 6 with the exceptions noted below. FIG. 7 illustrates the outlet 284 of the second exhaust gas conduit 274 in communication with the outlet 286 of the first exhaust gas conduit 272 and ultimately the turbine 266. FIG. 8 illustrates an engine assembly 310 similar to FIG. 7 with a turbine 366 having multiple inlets 388, 390. The outlet 386 of the first exhaust gas conduit 372 may be in communication with the first inlet 388 and the outlet 384 of the second exhaust gas conduit 374 may be in communication with the inlet 390. While FIGS. 7 and 8 are illustrated in combination with a valve 244, 344 in the second exhaust gas conduit 274, 374, it is understood that similar arrangements may be incorporated into the configuration shown in FIG. 1 where the second valve lift mechanism 44 forms the flow control mechanism.

The flow control mechanisms included in the engine assemblies 10, 110, 210, 310 may generally provide for greater control of turbo performance while allowing heat retention in the exhaust gas at cold start conditions. For example, when the second exhaust valves 38 (or valves 144, 244, 344) are maintained closed during engine operation, a reduced surface area for heat transfer may be provided by the first exhaust gas conduit 72, 172, 272, 372. As a result, exhaust treatment components may be able to reach operating temperatures more quickly.

What is claimed is:

1. An engine assembly comprising:
    an engine structure defining a first cylinder and first and second exhaust ports in communication with the first cylinder;
    a first exhaust gas conduit in fluid communication with the first exhaust port, the first exhaust gas conduit and the first exhaust port defining a first exhaust gas flow path;
    a second exhaust gas conduit in fluid communication with the second exhaust port, the second exhaust gas conduit and the second exhaust port defining a second exhaust gas flow path;
    a turbine in fluid communication with the first exhaust gas flow path and including a turbine wheel rotationally driven by exhaust gas from the first cylinder provided by the first exhaust gas conduit;
    a first exhaust valve located within the first exhaust port and a second exhaust valve located in the second exhaust port and a piston located within the first cylinder, a flow control mechanism engaged with the second exhaust valve and maintaining the second exhaust valve in a closed position during an exhaust stroke of the piston; and
    a first valve lift mechanism engaged with the first exhaust valve, a second valve lift mechanism engaged with the second exhaust valve and forming the flow control mechanism, and a camshaft supported for rotation on the engine structure and defining a first cam lobe engaged with the first valve lift mechanism and a second cam lobe engaged with the second valve lift mechanism, the first valve lift mechanism and the second valve lift mechanism operable in first and second modes and located in the second exhaust gas flow path, the first mode including the first exhaust valve being displaced to an open position when the first valve lift mechanism is engaged by a peak of the first cam lobe and the second exhaust valve remaining in a closed position when the second valve lift mechanism is engaged by a peak of the second cam lobe thereby preventing the exhaust gas from the first cylinder from flowing through the second exhaust gas flow path and forcing all of the exhaust gas from the first cylinder through the first exhaust gas flow path during the first mode and wherein the second mode includes the first exhaust valve being displaced to an open position when the first valve lift mechanism is engaged by the peak of the first cam lobe and the second exhaust valve being displaced to an open position when the second valve lift mechanism is engaged by the peak of the second cam lobe thereby allowing the exhaust gas from the first cylinder to flow through both the first and second exhaust gas flow paths during the second mode.

2. The engine assembly of claim 1, further comprising a turbocharger including the turbine and a compressor wheel fixed for rotation with the turbine wheel, the compressor wheel being in fluid communication with an intake air supply and an intake port defined in the engine structure in communication with the first cylinder.

3. The engine assembly of claim 1, further comprising a cam phaser coupled to the camshaft, the camshaft including a first shaft with the first cam lobe fixed for rotation with the first shaft and a second shaft with the second cam lobe fixed for rotation with the second shaft, the first shaft being rotatable relative to the second shaft and the cam phaser coupled to the first and second shafts.

4. The engine assembly of claim 1, wherein the first exhaust valve starts to open before the second exhaust valve starts to open relative to the exhaust stroke of the piston.

5. The engine assembly of claim 4, wherein the first exhaust valve starts to open before the beginning of the exhaust stroke of the piston.

6. The engine assembly of claim 1, wherein an inlet of the second exhaust gas conduit is in communication with the second exhaust port and an outlet of the second exhaust gas conduit is in communication with the turbine wheel.

7. The engine assembly of claim 1, wherein an inlet of the second exhaust gas conduit is in communication with the second exhaust port and an outlet of the second exhaust gas conduit is in communication with a location downstream of the turbine wheel.

8. The engine assembly of claim 1, wherein the engine structure defines a plurality of cylinders including the first cylinder and defines a first set of exhaust ports including the first exhaust port providing communication between each of the plurality of cylinders and the first exhaust gas conduit, the engine structure defining a second set of exhaust ports including the second exhaust port and providing communication between each of the plurality of cylinders and the second exhaust gas conduit.

9. The engine assembly of claim 8, further comprising a first set of exhaust valves located within the first set of exhaust ports and a second set of exhaust valves located in the second set of exhaust ports and pistons located within each of the cylinders and including a set of valve lift mechanisms engaged with the second set of exhaust valves and maintaining the second set of exhaust valves in a closed position during exhaust strokes of the pistons.

* * * * *